(12) United States Patent
Amano et al.

(10) Patent No.: US 6,886,765 B2
(45) Date of Patent: May 3, 2005

(54) SINGLE-REEL MAGNETIC TAPE CARTRIDGE

(75) Inventors: Kosuke Amano, Ibaraki (JP); Keiji Ban, Kyoto (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/322,646

(22) Filed: Dec. 19, 2002

(65) Prior Publication Data

US 2003/0132332 A1 Jul. 17, 2003

(30) Foreign Application Priority Data

Dec. 19, 2001 (JP) .................................. 2001-385371

(51) Int. Cl.[7] .............................................. G11B 23/07
(52) U.S. Cl. .................................... 242/338.1; 242/348
(58) Field of Search ............................. 242/338.1, 343, 242/343.1, 343.2, 348, 611, 611.1; 360/132

(56) References Cited

U.S. PATENT DOCUMENTS

| | | | | |
|---|---|---|---|---|
| 5,027,249 A | * | 6/1991 | Johnson et al. | ............. 360/132 |
| 5,901,916 A | * | 5/1999 | McAllister et al. | ......... 242/348 |
| 6,034,850 A | * | 3/2000 | Del Genio et al. | ......... 360/132 |
| 6,264,126 B1 | * | 7/2001 | Shima et al. | ................ 360/132 |
| 6,452,748 B1 | * | 9/2002 | Shima et al. | ................ 360/132 |
| 6,572,045 B2 | * | 6/2003 | Blair et al. | ................. 242/348 |
| 6,581,866 B2 | * | 6/2003 | Tsuyuki et al. | ............. 242/348 |

FOREIGN PATENT DOCUMENTS

JP      2000-339911 A      12/2000

* cited by examiner

*Primary Examiner*—William A. Rivera
(74) *Attorney, Agent, or Firm*—Birch, Stewart, Kolasch & Birch, LLP

(57) ABSTRACT

A single-reel tape cartridge includes a casing having a drive access hole defined therein, and a single tape reel rotatably accommodated within the casing and having a length of tape wound therearound. The tape reel includes a first flange having an opening defined therein, and a second flange with a hollow reel hub intervening therebetween. The tape cartridge includes a reel locking mechanism for preventing the tape reel from undergoing any arbitrary motion within the casing and a reel restraint mechanism for preventing the reel from undergoing an arbitrary motion in a direction laterally within the casing.

6 Claims, 4 Drawing Sheets

SINGLE-REEL MAGNETIC TAPE CARTRIDGE

BACKGROUND OF THE INVENTION

1. Field of the Invention

The present invention relates to a magnetic tape cartridge of a single reel type wherein only one tape reel having a length of magnetic recording or reproducing tape wound therearound is employed.

2. Description of the Prior Art

The single-reel magnetic tape cartridge of the type referred to above is known in the art from, for example, the Japanese Laid-open Patent Publication No. 2000-339911. The single-reel tape cartridge disclosed therein makes use of a reel locking mechanism for avoiding an arbitrary rattling motion of the reel within the cartridge and also for avoiding any possible loosening of the magnetic tape wound around the reel.

The reel locking mechanism of the type referred to above is shown in FIG. 7 and includes a reel retainer 42 disposed within the hollow of a reel hub 41 of the single reel 40 and normally urged downwardly, as viewed therein, by the action of a coiled spring 43 to prevent the reel 40 from undergoing an arbitrary motion within the cartridge. This reel retainer 42 is guided by a crisscross-sectioned guide 44, provided on an upper panel of the casing, for movement up and down and, so long as the reel retainer 42 is normally urged downwardly by the coiled spring 43, an inverted crown gear 45 provided on the undersurface of the reel retainer 42 is meshed with a crown gear 46 provided on a bottom wall of the reel hub 41 (or a center portion of the lower reel flange encompassed by the hollow of the reel hub 41) to thereby prevent the reel 41 from undergoing an arbitrary motion about the reel hub and also from undergoing an arbitrary up and down movement in a direction parallel to the longitudinal axis of the reel hub 41.

The reel locking mechanism shown in FIG. 7 also includes a lock release member 47 made of a steel material by the use of any known press work to represent a generally trifurcated shape and is disposed between the reel retainer 42 and the bottom wall of the reel hub 41. This lock release member 47 is so designed and so operable that when this lock release member 47 is urged upwardly against the biasing force of the coiled spring 43, the inverted crown gear 45 is disengaged from the mating crown gear 46 to allow the reel 40 to be freely rotatable. Although at this time the lock release member 47 rotates together with the reel 40 when the tape cartridge is in use, the use is made of a bearing ball 48 which is freely rotatably received in the undersurface of the reel retainer 42 to minimize the frictional resistance during the rotation of the reel 40, which ball 48 urges the lock release member 47 downwardly.

However, when the tape cartridge is not in use, i.e., is not loaded in the tape recording/reproducing apparatus, in order to retain the reel 40 in position without undergoing a lateral displacement in a direction generally perpendicular to the longitudinal axis of the reel hub 41, a ring-shaped engagement projection 49 is provided on the undersurface of that bottom wall of the reel hub 40 such that the engagement projection 49 can be held in abutment with an inclined inner peripheral wall 51 defining a drive access hole 50 that is defined in a center portion of the bottom panel of the casing. In other words, the inner peripheral wall 51 of the drive access hole 50 is so inclined as to diverge upwardly as viewed in FIG. 7 and, on the other hand, the engagement projection 49 has an outer wall surface so inclined as to converge downwardly, such that the engagement projection 49 can fit into the drive access hole 50 to thereby prevent the lateral displacement of the reel 40.

When and so long as the reel 40 is held in position with the engagement projection 49 fitted into the drive access hole 50, it is possible to avoid a displacement of the reel 40 relative to a drive shaft that is incorporated in the tape recording/reproducing apparatus for driving the reel within the cartridge. However, a problem has been recognized in that since the outer peripheral surface of the engagement projection 49 and the inner peripheral surface 51 each represent a simple tapering interface, the reel 40 may often displace laterally with the engagement projection 49 riding over the inclined peripheral surface 51 onto an inner surface of the bottom panel of the casing as clearly shown in FIG. 7, when an external force or impact acts on the cartridge in a direction generally transverse of the reel hub 40, resulting in the reel being held in a tilted fashion within the casing. When the tape cartridge with the reel 40 so held in the tilted fashion is loaded into the tape recording/reproducing apparatus, the drive shaft will fail to property engage the drive teeth 52 provided in the undersurface of the bottom wall of the reel hub 41 and, in the worst case it may occur, a tape drive mechanism within the tape recording/reproducing apparatus will be physically damaged.

SUMMARY OF THE INVENTION

Accordingly, the present invention is intended to provide an improved single-reel tape cartridge of a design effective to retain the reel in a proper wait position during non-use thereof without being displaced in any way what so ever even when an external force or impact acts on the cartridge and which can therefore provide a high reliability in operation when the tape cartridge is in use in association with the tape recording/reproducing apparatus.

In order to achieve the foregoing object of the present invention, there is provided a single-reel tape cartridge including a casing having a drive access hole defined therein; a single tape reel rotatably accommodated within the casing and having a length of tape wound therearound; and a reel locking mechanism. The tape reel includes a first flange having an opening defined therein, a second flange, and a hollow reel hub connecting between the first and second flanges together with the opening in the first flange aligned with a hollow in the reel hub. The reel locking mechanism is interposed between a wall portion of the casing confronting the hollow reel hub and opposite to the drive access hole and a center portion of the second flange encompassed by the hollow reel hub and operatively accommodated within the hollow in the reel hub for preventing the tape reel from undergoing any arbitrary motion within the casing.

The single-reel tape cartridge also includes a biasing spring housed within the casing for urging the tape reel in a direction towards the drive access hole; and a reel restraint mechanism provided in a space delimited between a peripheral wall defining the drive access hole and the second flange for preventing the reel from undergoing an arbitrary motion in a direction laterally within the casing. The reel restraint mechanism includes a restraint member, formed in a peripheral lip region of the second flange around the drive access hole, and an engagement member formed in a portion of the second flange and engageable with the restraint projection.

According to the present invention, when and so long as the tape reel is not in use, engagement between the engagement member and the restraint projection is effective to avoid an arbitrary lateral motion of the reel relative to the casing and, therefore, the tape reel can be firmly retained in a proper wait position without being displaced even when an external force or impact acts on the cartridge in a direction generally transverse to the longitudinal axis of the reel hub. Accordingly, the present invention is effective to avoid the possibility that the tape cartridge with the reel held in an improper position may be loaded in the tape recording/reproducing apparatus and is therefore effective to allow the drive shaft to be assuredly and reliably engaged with the drive teeth.

In a preferred embodiment, the restraint member may be made up of an outer rib for supporting the second flange from below, an inner rib continued to a peripheral wall defining the drive access hole and a first annular groove, and the engagement member is made up of an engagement rib engageable in the first annular groove 34 and a second annular groove for receiving therein the inner rib. This ensures that the restraint member and the engagement member are so designed as to perform a self-centering function to allow the tape reel to be properly positioned relative to the drive access hole and, accordingly, even though the tape reel may "float", the self-centering function permits the tape reel to be automatically positioned in the proper wait position. Also, since the restraint member includes the outer and inner ribs and the engagement member include the engagement rib, an arbitrary motion suppressing function can be uniformly obtained all over those ribs.

Also, in another preferred embodiment, the reel locking mechanism may include a reel retainer slidable up and down guided by a guide projection formed on wall portion of the casing opposite to the drive access hole, and non-rotatable relative to the casing, first locking teeth provided on an undersurface of the reel retainer, second locking teeth provided on that portion of the second flange encompassed by the hollow reel hub and engageable with the first locking teeth to prevent rotation of the tape reel, and further comprising a lock release member adapted to be operated by an external drive shaft to disengage the first and second locking teeth from each other to thereby allow the reel retainer to move against the biasing spring. This lock release member is positioned in a space between the reel retainer and the second flange.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 6 is a view similar to FIG. 1A, showing a reel locking mechanism having been set to a release position.

DESCRIPTION OF THE EMBODIMENT

Figure 1:
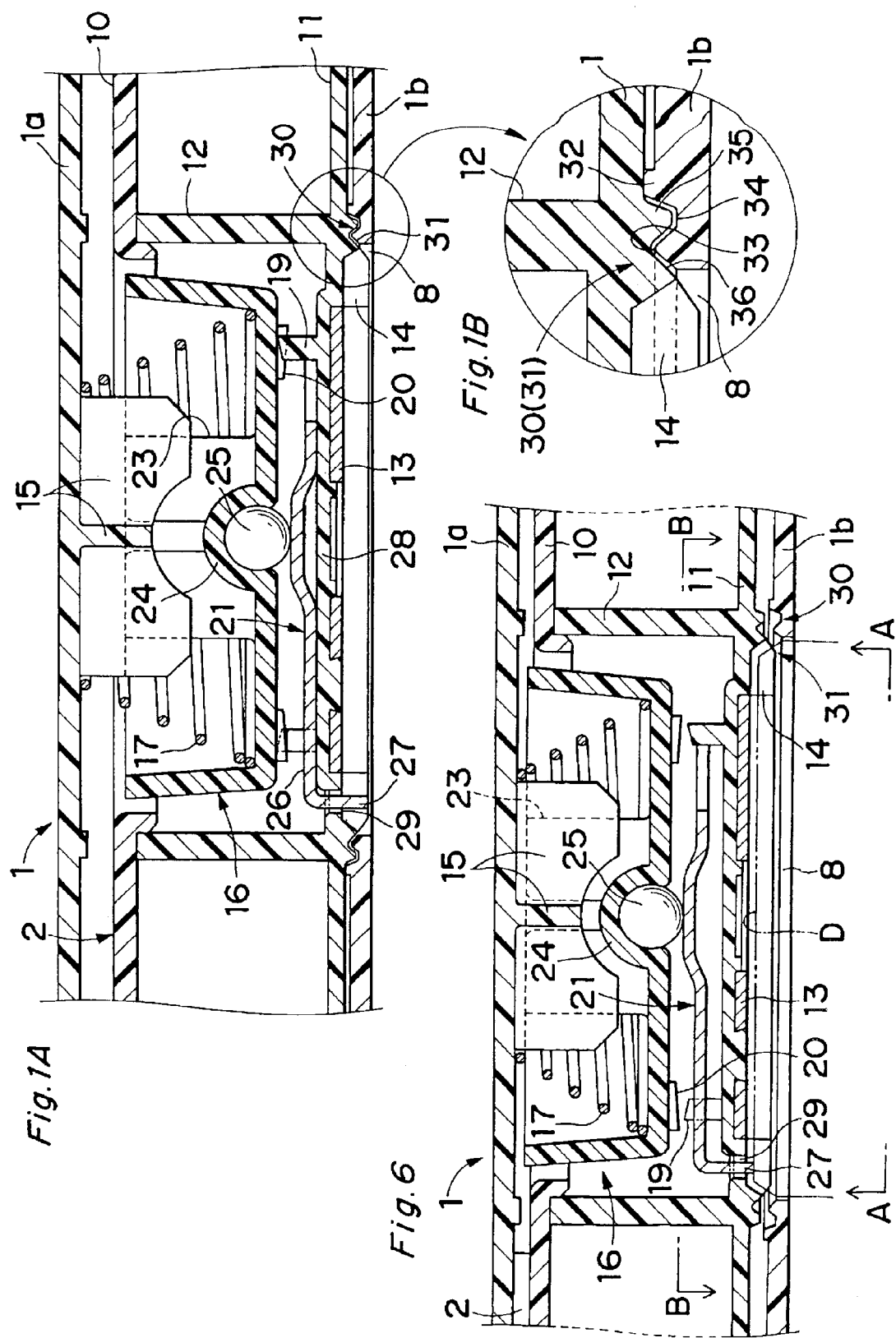
FIG. 1A is a fragmentary side sectional view showing an important portion of a single-reel magnetic tape cartridge embodying the present invention, with a reel locking mechanism set in a locking position.
FIG. 1B is a fragmentary side sectional view showing another important portion, on an enlarged scale, of the single-reel magnetic tape cartridge that is encompassed by the circle shown in FIG. 1A.

Referring to FIGS. 1A to 6, a single-reel magnetic tape cartridge embodying the present invention includes a casing 1 of a generally rectangular flattened box-like configuration made up of upper and lower casing halves 1a and 1b assembled together in any known manner so that the casing 1 as a whole can have upper and lower panels and four side walls lying perpendicular to any one of the top and bottom panels, with one of the side walls having a gateway 5 defined therein.

A single tape reel 2 is freely rotatably accommodated within the casing 1 and has a length of magnetic recording tape 3 wound therearound. This tape reel 2 includes upper and lower flanges 10 and 11 and a cylindrical hollow reel hub 12 connecting the upper and lower flanges 10 and 11 together to represent a generally H-sectioned configuration. The single tape reel 2 has an upper opening defined in the upper flange 10 in alignment with the hollow of the hollow reel hub 12 such that the hollow of the hollow reel hub 12 together with the upper opening in the upper flange 10 occupies a position corresponding to the transverse short bar of the shape of a figure "H" assumed by the sectional representation of the tape reel 2. So far shown, the cylindrical hollow reel hub 12 is integrally formed with the lower flange 11 so as to extend perpendicular thereto, while an upper annular end of the hollow reel hub 12 remote from the lower flange 12 is fusion bonded to a peripheral lip region of the upper flange 11 around the corresponding upper opening.

Figure 2:
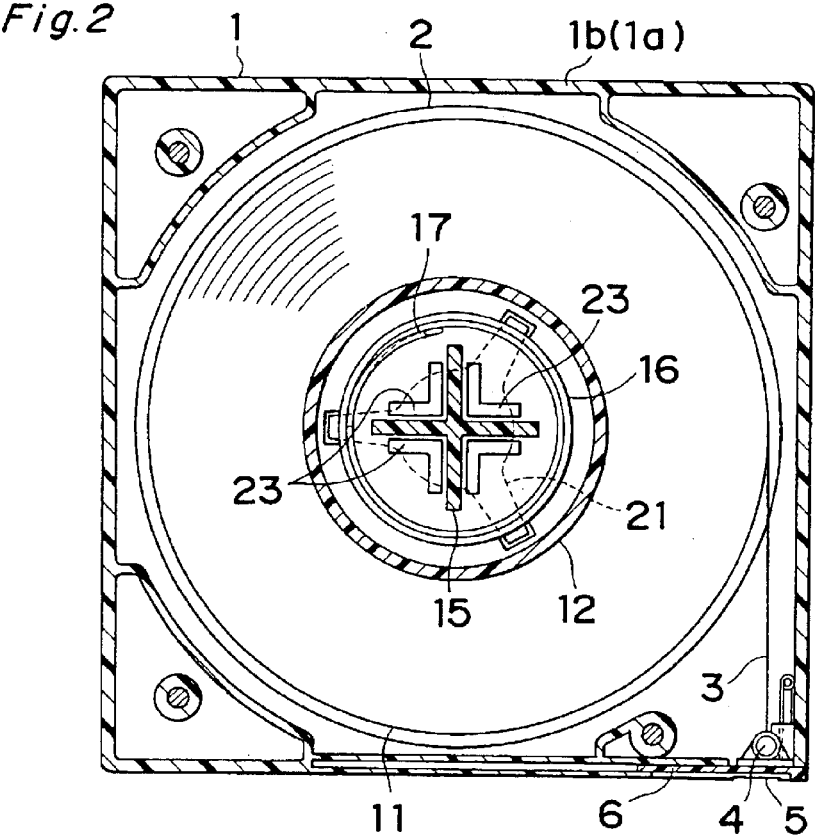
FIG. 2 is a transverse sectional view of the single-reel magnetic tape cartridge.

As a matter of design, the length of recording tape 3 carried by the tape reel 2 has one end anchored to the hollow reel hub 12 of the tape reel 2 and the opposite end coupled non-detachably with a loading pin 4. As best shown in FIG. 2, the loading pin 4, engageable with a tape drawing mechanism (not shown) employed in a tape recording and/or reproducing apparatus (also not shown) when the length of recording tape 3 is desired to be drawn out of or withdrawn into the casing 1 through the gateway 5, is positioned within the casing 1 at one of four corners, for example, a front right corner as viewed therein, adjacent the gateway 5, with its opposite ends trapped in respective catches (not shown) each defined in a corresponding portion of an inner surface of the upper or lower panels of the casing 1.

It is to be noted that the gateway 5 is normally closed by a slide lid 6 by the action of a biasing spring (not shown), which slide lid 6 can be opened either manually or automatically as the tape cartridge is loaded into the tape recording and/or reproducing apparatus. In any event, the single-reel magnetic tape cartridge of the structure so far described is well known to those skilled in the art and, therefore, no further detail thereof will be described for the sake of brevity.

The single-reel tape cartridge also includes a reel locking mechanism operatively accommodated within the hollow of the hollow reel hub 12 in a manner as will be described in detail for preventing the tape reel 2 from arbitrarily rotating when and so long as the single-reel tape cartridge is not in use. As best shown in FIG. 6, a center portion of the lower flange 11 aligned with the hollow boss 12 has a round absorbent plate 13 externally fusion bonded thereto and also has a circular row of drive teeth 14 formed therein so as to externally surround the absorbent plate 13. The absorbent plate 13 is prepared from a metallic plate such as, for example, an iron or steel plate that can be magnetically attracted. The circular row of the driven teeth 14 defines a crown gear and protrudes outwardly from that center portion of the lower flange 11 in a direction substantially parallel to the longitudinal axis of the hollow reel hub 12 with the teeth 14 oriented radially so that, when and so long as the single-reel tape cartridge is loaded in the tape recording/reproducing apparatus, a mating crown gear defined on one end face of a drive shaft D shown in FIG. 6 in the tape recording/reproducing apparatus can be brought into engagement with the driven teeth 14 to thereby transmit a rotation of the drive shaft D to the tape reel 2. The circular row of the driven teeth 14 so formed in that center portion of the lower flange 11 is exposed to the outside of the tape cartridge through a drive access hole 8 defined in a corresponding portion of the lower panel of the lower casing half 1b.

Figure 3:
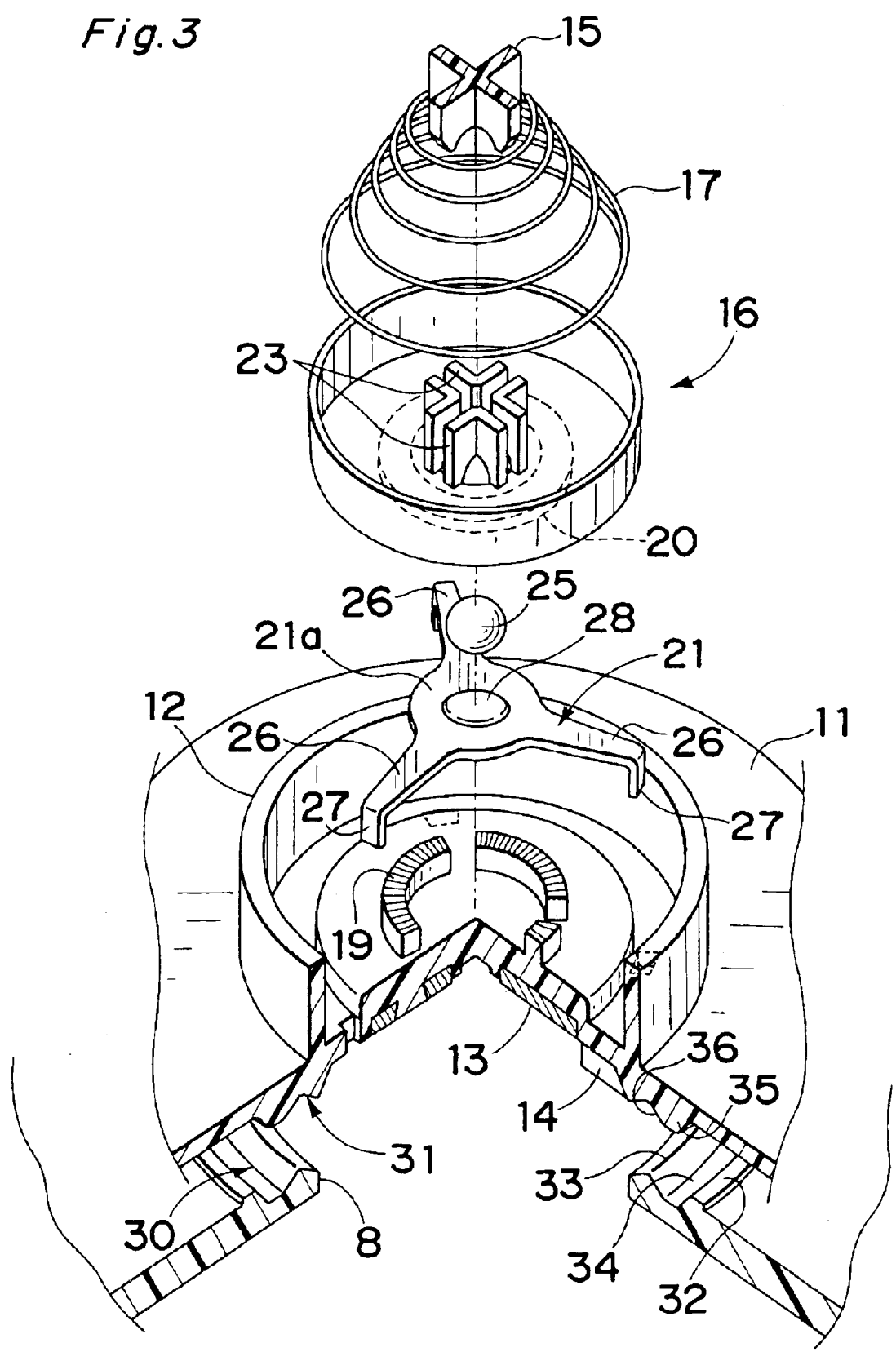
FIG. 3 is an exploded view of that portion of the single-reel magnetic tape cartridge shown in FIG. 1A.
Figure 7:
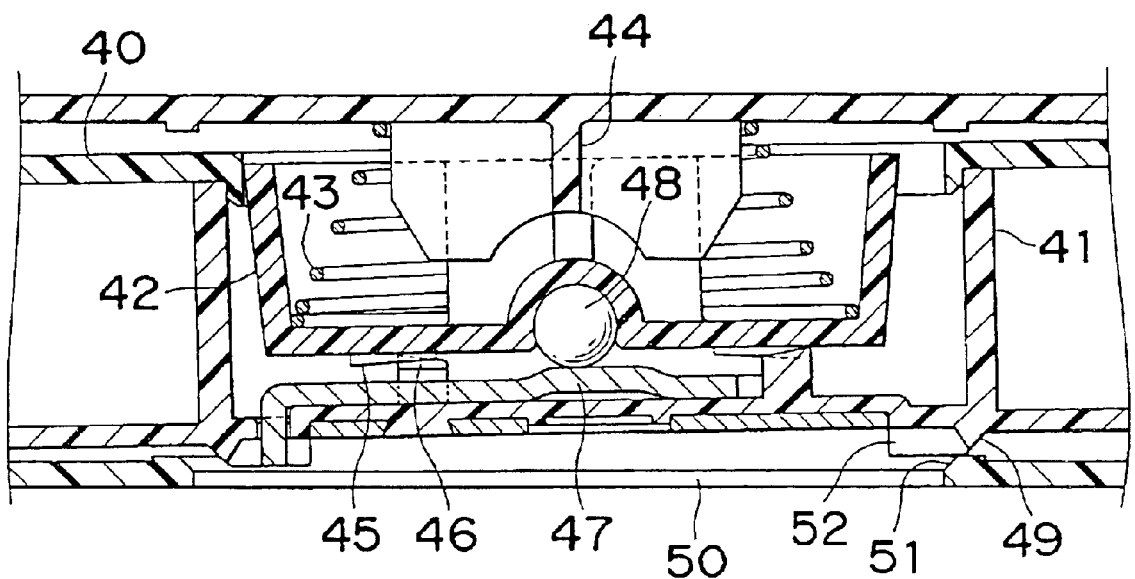
FIG. 7 is a view similar to FIG. 1A, showing a corresponding portion of the conventional single-reel magnetic tape cartridge utilizing the reel locking mechanism.

As best shown in FIGS. 1A, 2 and 3, the reel locking mechanism includes a generally cup-shaped reel retainer 16 slidable up and down while guided by a crisscross-sectioned guide projection 15 that is formed integrally with the upper panel of the casing 1, particularly that of the upper casing half 1a, so as to extend generally into the hollow of the hollow reel hub 12. The reel retainer 16 so guided by the crisscross-shaped guide projection 15 is non-rotatable relative to the tape reel 2. The reel locking mechanism also includes a coiled spring 17 interposed between the reel retainer 16 and the upper panel of the casing 1 to urge the reel retainer 16 downwardly, as viewed in FIG. 1A, towards that center portion of the lower flange 11, a crown gear 19 formed integrally with or fixedly mounted on that center portion of the lower flange 11 in alignment with the longitudinal axis of the hollow reel hub 12, and an inverted crown gear 20 formed integrally with or fixedly mounted on an undersurface of the reel retainer 16 and normally engaged with the crown gear 19 as the reel retainer 16 is biased downwardly by the coiled spring 17. The guide projection 15 is made up of four wall members assembled together to have a generally crisscross-sectioned configuration and slidingly cooperate with a generally crisscross-shaped guide groove that is defined by four L-shaped wall members 23 formed integrally with or fixedly mounted on the center portion of the reel retainer 16 and arranged so as to define such crisscross-shaped guide groove.

The reel locking mechanism further includes a lock release member 21 positioned within a space delimited between the reel retainer 16 and that center portion of the lower flange 11 aligned with the cylindrical hollow reel hub 12 for driving the reel retainer 16 in a direction against the biasing force of the coiled spring 17 substantially as shown in FIG. 6.

The reel retainer 16 is made of a plastics material and is of a shape substantially similar to the shape of a cylindrical cup opening upwardly with the L-shaped wall members 23 formed integrally with or fixedly mounted on a bottom of the reel retainer 16. With the crisscross-sectioned guide projection 15 engaged in the correspondingly crisscross-shaped guide groove defined by the L-shaped wall members 23, it will readily be seen that the reel retainer 16 can slide up and down one at a time, but cannot rotate about the longitudinal axis of the hollow reel hub 12. As best shown FIGS. 1A and 6, the bottom of the reel retainer 16 has a generally semispherical socket 24 defined at a center portion thereof and radially inwardly of the counter inverted crown gear 20 so as to be depressed inwardly thereof, and a bearing ball 25 is rotatably and non-detachably accommodated within the generally semispherical socket 14.

As clearly shown in FIG. 3, the lock release member 21 is of a generally trifurcated shape and includes a disc 21a and three equally spaced radial arms 26 formed integrally or fixedly connected with the disc 21a so as to extend radially outwardly thereof while spaced an equal distance from each other in a direction circumferentially of the disc 21a. Respective free ends of the radial arms 26 remote from the disc 21a are bent downwardly towards that center portion of the lower flange 11 to thereby define a bent piece 27. The disc 21a of the lock release member 21 has a center portion thereof bulged so as to protrude towards the reel retainer 16 to thereby define a ball contact seat 28 on which the bearing ball 25 rotatably retained within the socket 24 is rotatably seated.

The lock release member 21 of the structure described above may be made of a steel material and may be formed together with the disc 21a and the radial arms 26 by the use of any known press work. This lock release member 21 is normally urged by the biasing force of the coiled spring 17, transmitted thereto through the reel retainer 16 with the disc 21a consequently seated on that center portion of the lower flange 11 encompassed by the hollow reel hub 12 as clearly shown in FIG. 1A. The crown gear 19 has, as best shown in FIG. 5, three toothless areas defined therein for avoiding interference with and accommodating therein the corresponding radial arms 26 of the lock release member 21 when the lock release member 21 is seated on the lower flange 11, having been biased by the coiled spring 17 in the manner described above.

Figure 4:
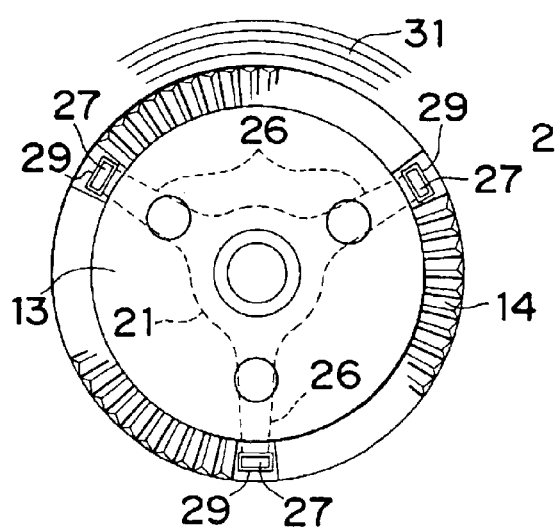
FIG. 4 is a cross-sectional view taken along the line A—A in FIG. 6.
Figure 5:
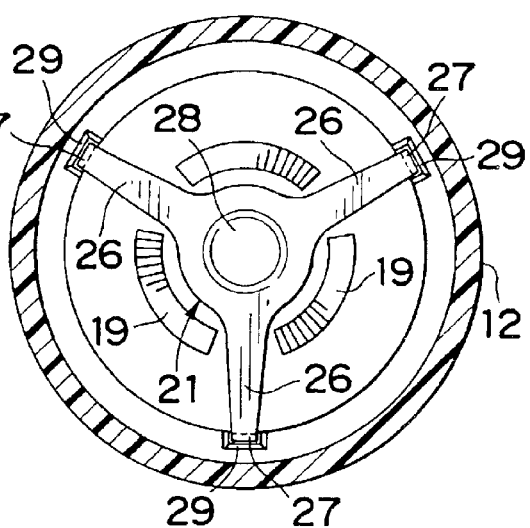
FIG. 5 is a cross-sectional view taken along the line B—B in FIG. 6.

Also, in this condition, the bent pieces 27 integral with the associated radial arms 26 of the lock release member 21 are engaged in respective perforations 29, defined in that center portion of the lower flange 11 encompassed by the hollow reel hub 12 as shown in FIGS. 4 and 5, and are exposed to the outside through these perforations 29. These bent pieces 27 are, when the tape cartridge is loaded in the tape recording and/or reproducing apparatus when the mating crown gear (not shown) on the drive shaft D (FIG. 6) engaged with the crown gear on the lower flange 11, that is, the circular row of drive teeth 14 integral with the lower flange 11, kicked upwardly by some of the teeth of the mating crown gear then entering the perforations 29, wherefore the lock release member 21 can be shifted upwardly against the biasing force of the coiled spring 17 and in turn shift the reel retainer 16 upwardly through the bearing ball 25 with the counter inverted crown gear 20 consequently disengaged from the crown gear 19.

Thus, it will readily be seen that while the lock release member 21 is normally held at a locking position by the action of the coiled spring 17, with the bent pieces 27 engaged in the corresponding perforations 29, the lock release member 21 can be moved towards a release position against the biasing force of the coiled spring 17 in response to loading of the tape cartridge into the tape recording/reproducing apparatus. Specifically, when the tape cartridge is loaded into the tape recording/reproducing apparatus, the bent pieces 27 are kicked upwardly in contact with some of the teeth of the mating crown gear rigid or integral with the drive shaft D and, thus, the lock release member 21 is moved to the release position. It is to be noted that as clearly shown in FIG. 6, when the lock release member 21 is moved to the release position, the bent pieces 27 of the lock release member 21 does not separate completely from the corresponding perforations 29, but remain within the corresponding perforations 29 so that the lock release member 21 can rotate together with the tape reel 2 and relative to the reel retainer 16.

Referring particularly to FIGS. 1A, 1B and 2, when and so long as the tape cartridge is not in use, the tape reel is generally retained by a peripheral wall of the drive access hole defined in the lower panel of the casing. However, in accordance with the present invention, in order for the tape reel 2 to be firmly retained firmly in a wait position with a minimized possibility of being laterally displaced within the casing 1, the tape cartridge furthermore includes a reel restraint mechanism. This reel restraint mechanism includes a round restraint projection 30, formed in the peripheral lip region of the lower panel of the casing 1 encircling the access drive hole 8, and a round engagement projection 31 formed in a portion of the outer surface of the lower flange 11 radially outwardly of the circular row of the drive teeth 14 and aligned with and engageable with the round restraint projection 30. Both of the round projections 30 and 31 are coaxial with the longitudinal axis of the hollow reel hub 12 and also with the geometric center of the drive access hole 8.

More specifically, as shown in FIG. 1B, the restraint projection 30 is made up of a round outer rib 32 for supporting the lower flange 11 from below, a round inner rib 33 of a generally triangular cross-section having one side continued slantwise to the drive access hole, and a first annular groove 34 of a generally inverted trapezoidal cross-section defined between the outer and inner ribs 32 and 33. On the other hand, the engagement projection 31 is made up of a round engagement rib 35 of a generally inverted trapezoidal cross-section engageable in the first annular groove 34, and a second annular groove 36 for receiving therein the inner rib 33. With the engagement projection 31 engaged with the restraint projection 30 as best shown in FIG. 1B, that is, when the tape reel 2 is locked immovable within the casing 1 by the action of the coiled spring 17, the engagement rib 35 integral with the tape reel 2 is received in the first annular groove 34 in the lower panel of the casing 1 and, at the same time, the second annular groove 36 integral with the tape reel 2 received therein the inner rib 33 integral with the casing 1 and, accordingly, the tape reel 2 is prevented from undergoing any arbitrary motion in a direction radially thereof. Thus, even when an external force or impact acts on the tape cartridge with the tape reel 2 tending to move laterally in the radial direction, the tape reel 2 will not displace or tilt laterally and can be kept in a proper wait posture.

The single-reel tape cartridge of the structure described above operates in the following manner. When the tape cartridge is in use, that is, when the tape cartridge is loaded in the tape recording/reproducing apparatus, the slide lid 6 is opened in response to loading of the tape cartridge into the tape recording/reproducing apparatus and the loading pin 4 is subsequently caught by the loading mechanism. At the same time, the drive shaft D shown in FIG. 6 is brought into engagement with the center portion of the lower flange 11 with the crown gear on the drive shaft D engaged with the inverted crown gear 14 integral or rigid with the tape reel 2. Since the drive shaft D enters the drive access hole 8 from below, engagement between the crown gear on the drive shaft D with the inverted crown gear 14 integral or rigid with the tape reel 2 is followed by upward shift of the lock release member 21 with the bent pieces 27 kicked upwardly by some of the teeth of the crown gear on the drive shaft D against the biasing force of the coiled spring 17 in the manner described hereinbefore. Upward shift of the lock release member 21 is transmitted through the bearing ball 25 to the reel retainer 16 with the crown gear 19 consequently disengaged from the inverted crown gear 20 and, hence, the tape reel 2 is brought in position to rotate freely. Thus, as the loading pin 4 is pulled outwardly of the tape cartridge, the length of the magnetic tape 3 wound around the tape reel 2 can be drawn out of the tape cartridge and into the tape recording/reproducing apparatus.

When the length of the magnetic tape 3 once drawn out of the tape cartridge is to be withdrawn into the tape cartridge and rewound around the tape reel, the tape cartridge functions in a manner substantially reverse to that described hereinabove.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A single-reel tape cartridge, comprising:

a casing having a drive access hole defined therein;

a single tape reel rotatably accommodated within the casing and having a length of tape wound therearound;

said tape reel including a first flange having an opening defined therein, a second flange, and a hollow reel hub connecting between the first and second flanges together with the opening in the first flange aligned with a hollow in the reel hub;

a reel locking mechanism interposed between a wall portion of the casing confronting the hollow reel hub and opposite to the drive access hole and a center portion of the second flange encompassed by the hollow reel hub and operatively accommodated within the hollow in the reel hub for preventing the tape reel from undergoing any arbitrary motion within the casing;

a biasing spring housed within the casing for urging the tape reel in a direction towards the drive access hole; and a reel restraint mechanism provided in a space delimited between a peripheral wall defining the drive access hole and the second flange for preventing the reel from undergoing an arbitrary motion in a direction laterally within the casing, said reel restraint mechanism including a restraint member formed in a peripheral lip region of the casing around the drive access hole, and an engagement member formed in a portion of the second flange and engageable with the restraint member, wherein the restraint member is made up of an outer rib for supporting the second flange from below, an inner rib continued to a peripheral wall defining the drive access hole and a first annular groove and wherein the engagement member is made up of an engagement rib engageable in the first annular groove and a second annular groove for receiving therein the inner rib.

2. The single-reel tape cartridge as claimed in claim 1, wherein the reel locking mechanism includes a reel retainer slidable up and down guided by a guide projection formed on wall portion of the casing opposite to the drive access hole, said reel retainer being non-rotatable relative to the casing, first locking teeth provided on an undersurface of the reel retainer, second locking teeth provided on that portion of the second flange encompassed by the hollow reel hub and engageable with the first locking teeth to prevent rotation of the tape reel, and further comprising a lock release member adapted to be operated by an external drive shaft to disengage the first and second locking teeth from each other to thereby allow the reel retainer to move against the biasing spring, said lock release member being positioned in a space between the reel retainer and the second flange.

3. The single-reel tape cartridge as claimed in claim 1, wherein said outer rib includes a generally vertical outer peripheral wall and a non-vertical, inclined inner peripheral wall which continuously declines into said first annular groove.

4. A single-reel tape cartridge, comprising:

a casing having a drive access hole defined therein;

a single tape reel rotatably accommodated within the casing and having a length of tape wound therearound;

said tape reel including a first flange having an opening defined therein, a second flange, and a hollow reel hub connecting between the first and second flanges together with the opening in the first flange aligned with a hollow in the reel hub;

a reel locking mechanism interposed between a wall portion of the casing confronting the hollow reel hub and opposite to the drive access hole and a center portion of the second flange encompassed by the hollow reel hub and operatively accommodated within the hollow in the reel hub for preventing the tape reel from undergoing any arbitrary motion within the casing;

a biasing spring housed within the casing for urging the tape reel in a direction towards the drive access hole; and a reel restraint mechanism provided in a space delimited between a peripheral wall defining the drive access hole and the second flange for preventing the reel from undergoing an arbitrary motion in a direction laterally within the casing, said reel restraint mechanism including a restraint projection formed in a peripheral lip region of the casing around the drive access hole, and an engagement projection formed in a portion of the second flange and engageable with the restraint projection, said restraint projection including an outer rib for supporting the second flange from below, an inner rib, and a first annular groove, said inner rib having an inner surface that continuously declines to a peripheral wall defining the drive access hole, wherein the engagement projection is made up of an engagement rib engageable in the first annular groove and a second annular groove for receiving therein the inner rib.

5. The single-reel tape cartridge as claimed in claim 4, wherein the reel locking mechanism includes a reel retainer slidable up and down guided by a guide projection formed on wall portion of the casing opposite to the drive access hole, said reel retainer being non-rotatable relative to the casing, first locking teeth provided on an undersurface of the reel retainer, second locking teeth provided on that portion of the second flange encompassed by the hollow reel hub and engageable with the first locking teeth to prevent rotation of the tape reel, and further comprising a lock release member adapted to be operated by an external drive shaft to disengage the first and second locking teeth from each other to thereby allow the reel retainer to move against the biasing spring, said lock release member being positioned in a space between the reel retainer and the second flange.

6. The single-reel tape cartridge as claimed in claim 4, wherein said outer rib includes a generally vertical outer peripheral wall and a non-vertical, inclined inner peripheral wall which continuously declines into said first annular groove.

* * * * *